(12) United States Patent
Kusaka et al.

(10) Patent No.: US 12,546,983 B2
(45) Date of Patent: Feb. 10, 2026

(54) MICROSCOPE USED IN MULTIPLE MICROSCOPIES

(71) Applicant: EVIDENT CORPORATION, Nagano (JP)

(72) Inventors: Kenichi Kusaka, Tokyo (JP); Kenji Kawasaki, Tokyo (JP)

(73) Assignee: Evident Corporation, Nagano (JP)

( * ) Notice: Subject to any disclaimer, the term of this patent is extended or adjusted under 35 U.S.C. 154(b) by 730 days.

(21) Appl. No.: 17/568,981

(22) Filed: Jan. 5, 2022

(65) Prior Publication Data

US 2022/0221702 A1 Jul. 14, 2022

(30) Foreign Application Priority Data

Jan. 8, 2021 (JP) ................................. 2021-002410

(51) Int. Cl.
  *G02B 21/02* (2006.01)
  *G02B 21/06* (2006.01)
  *G02B 21/26* (2006.01)

(52) U.S. Cl.
  CPC .......... *G02B 21/025* (2013.01); *G02B 21/06* (2013.01); *G02B 21/26* (2013.01)

(58) Field of Classification Search
  CPC .. G02B 21/0092; G02B 21/025; G02B 21/02; G02B 21/365; G02B 21/06; G02B 21/086; G02B 21/18; G02B 21/0032; G02B 21/26
  See application file for complete search history.

(56) References Cited

U.S. PATENT DOCUMENTS

| 5,668,661 | A | * | 9/1997 | Tomioka | G02B 21/22 |
| | | | | | 359/368 |
| 2001/0008461 | A1 | * | 7/2001 | Koyama | G02B 7/16 |
| | | | | | 359/368 |
| 2002/0021490 | A1 | | 2/2002 | Kasahara et al. | |
| 2003/0016301 | A1 | * | 1/2003 | Aizaki | H04N 23/72 |
| | | | | | 348/79 |
| 2012/0307036 | A1 | * | 12/2012 | Yamamoto | G02B 21/025 |
| | | | | | 348/79 |
| 2014/0049815 | A1 | | 2/2014 | Kusaka | |
| 2014/0118820 | A1 | * | 5/2014 | Kaneki | G02B 21/0092 |
| | | | | | 359/386 |
| 2014/0293411 | A1 | | 10/2014 | Kaneki et al. | |
| 2016/0373670 | A1 | * | 12/2016 | Matsubara | G02B 21/365 |

(Continued)

FOREIGN PATENT DOCUMENTS

| JP | 2002-031758 A | | 1/2002 | |
| JP | 2005017808 A | * | 1/2005 | ............. G02B 21/26 |
| JP | 2006-154230 A | | 6/2006 | |

(Continued)

OTHER PUBLICATIONS

Japanese Office Action dated Dec. 10, 2024 received in 2021-002410.

*Primary Examiner* — Ephrem Z Mebrahtu
(74) *Attorney, Agent, or Firm* — Scully, Scott, Murphy & Presser, P.C.

(57) ABSTRACT

A microscope used in multiple microscopies includes an objective used in common in the multiple microscopies, and a magnification adjustment device arranged on an image side of the objective and configured to adjust an optical magnification of the microscope in response to switching of the multiple microscopies.

13 Claims, 13 Drawing Sheets

(56) References Cited

U.S. PATENT DOCUMENTS

| | | | | |
|---|---|---|---|---|
| 2019/0391381 A1* | 12/2019 | Kawasaki | ............ | G02B 21/365 |
| 2021/0319208 A1* | 10/2021 | Ohara | .................. | G02B 21/086 |

FOREIGN PATENT DOCUMENTS

| | | |
|---|---|---|
| JP | 2006-178440 A | 7/2006 |
| JP | 2008039918 A | 2/2008 |
| JP | 2008096893 A | 4/2008 |
| JP | 2014-092640 A | 5/2014 |
| JP | 2014-197091 A | 10/2014 |
| JP | 6150586 B2 | 6/2017 |
| JP | 6192335 B2 | 9/2017 |
| WO | 2012-150689 A1 | 11/2012 |

* cited by examiner

| | PREDETERMINED MAGNIFICATION | OBJECTIVE LENS | INTERMEDIATE VARIABLE MAGNIFICATION |
|---|---|---|---|
| BF | 10× | 20× | 0.5× |
| RC | 20× | 20× | 1× |
| PO | 20× | 20× | 1× |
| DIC | 60× | 20× | 3× |
| PC | 60× | 20× | 3× |

FIG. 4

MICROSCOPE USED IN MULTIPLE MICROSCOPIES

CROSS REFERENCE TO RELATED APPLICATIONS

This application is based upon and claims the benefit of priority from prior Japanese Patent Application No. 2021-002410, filed Jan. 8, 2021, the entire contents of which are incorporated herein by this reference.

TECHNICAL FIELD

The disclosure of the present specification is related to a microscope used in multiple microscopies.

BACKGROUND

At present with advancement of late marriage and late birth, the number of patients who receive fertility treatment has been increased year by year, and demands for an assisted reproductive technology (ART) have been further increased.

ART is a collective term of technologies for combining an egg and sperm taken out from people with each other in vitro such as micro insemination using intracytoplasmic sperm injection (ICSI), and in vitro fertilization (IVF). ART is distinguished from general artificial insemination for injecting collected sperm into a womb to be combined with an egg in vivo.

A technology associated with ART is described, for example, in International Publication No. WO 2012/150689. International Publication No. WO 2012/150689 describes a microscope suitable for intracytoplasmic sperm injection (ICSI) used in the micro insemination which is a type of ART. It is noted that ICSI is a method of piercing an injection pipette containing sperm into an egg held by a holding pipette to directly inject the sperm into the egg.

SUMMARY

A microscope according to an aspect of the present invention is a microscope used in multiple microscopies, the microscope including an objective used in common in the multiple microscopies, and a magnification adjustment device arranged on an image side of the objective and configured to adjust an optical magnification of the microscope in response to switching of the multiple microscopies.

A microscope according to another aspect of the present invention is a microscope used in multiple microscopies, the microscope including an objective used in common in the multiple microscopies, and a magnification adjustment device that includes a plurality of optical units corresponding to the multiple microscopies and is arranged on an image side of the objective, the magnification adjustment device being configured to adjust an optical magnification of the microscope in response to switching of the multiple microscopies, when the optical magnification of the microscope is different from a predetermined magnification for a microscopy after the switching, change the optical magnification of the microscope to the predetermined magnification, and perform the switching of the multiple microscopies and the adjustment of the optical magnification of the microscope by switching the plurality of optical units. Each of the plurality of optical units includes at least one of an optical system having a magnification according to a magnification ratio between a magnification of the objective and a predetermined magnification for the microscopy corresponding to the optical unit, and a modulation optical element according to the microscopy corresponding to the optical unit, and a casing accommodating together at least one of the optical system and the modulation optical element which are included in the optical unit.

BRIEF DESCRIPTION OF DRAWINGS

FIG. 4 is a diagram exemplifying a relationship among a predetermined magnification for each of microscopies, a magnification of an objective, and a magnification of a magnification adjustment device.
FIG. 13 is a diagram exemplifying a configuration of a microscopic system 1a.

DESCRIPTION OF EMBODIMENTS

In micro insemination, sperm is selected by an embryologist under a microscope, and sperm suitable for fertilization is injected into an egg. To increase a success rate of the micro insemination, a series of works performed under the microscope is to be skillfully performed in a short period of time by switching microscopies and observation magnifications for various settings. When a microscope described in International Publication No. WO 2012/150689 is used, since the embryologist can change the microscopy and the observation magnification at once by a button operation, microscopic operations are simplified, and as a result, work hours can be shortened.

However, in the microscope described in International Publication No. WO 2012/150689, when the observation magnification is changed together with the microscopy, objectives are switched in response to the button operation. For this reason, deviation from accurate focus may occur due to a slight difference of a parfocal distance between the objectives before and after the switching. In addition, the center of the field of view may be deviated due to axial misalignment. When such phenomena occur, since the embryologist takes time to correct these deviations, it is difficult to continue the observation smoothly after the switching of the microscopies.

In view of the above described circumstances, hereinafter, embodiments of the present invention will be described.

First Embodiment

Figure 1:
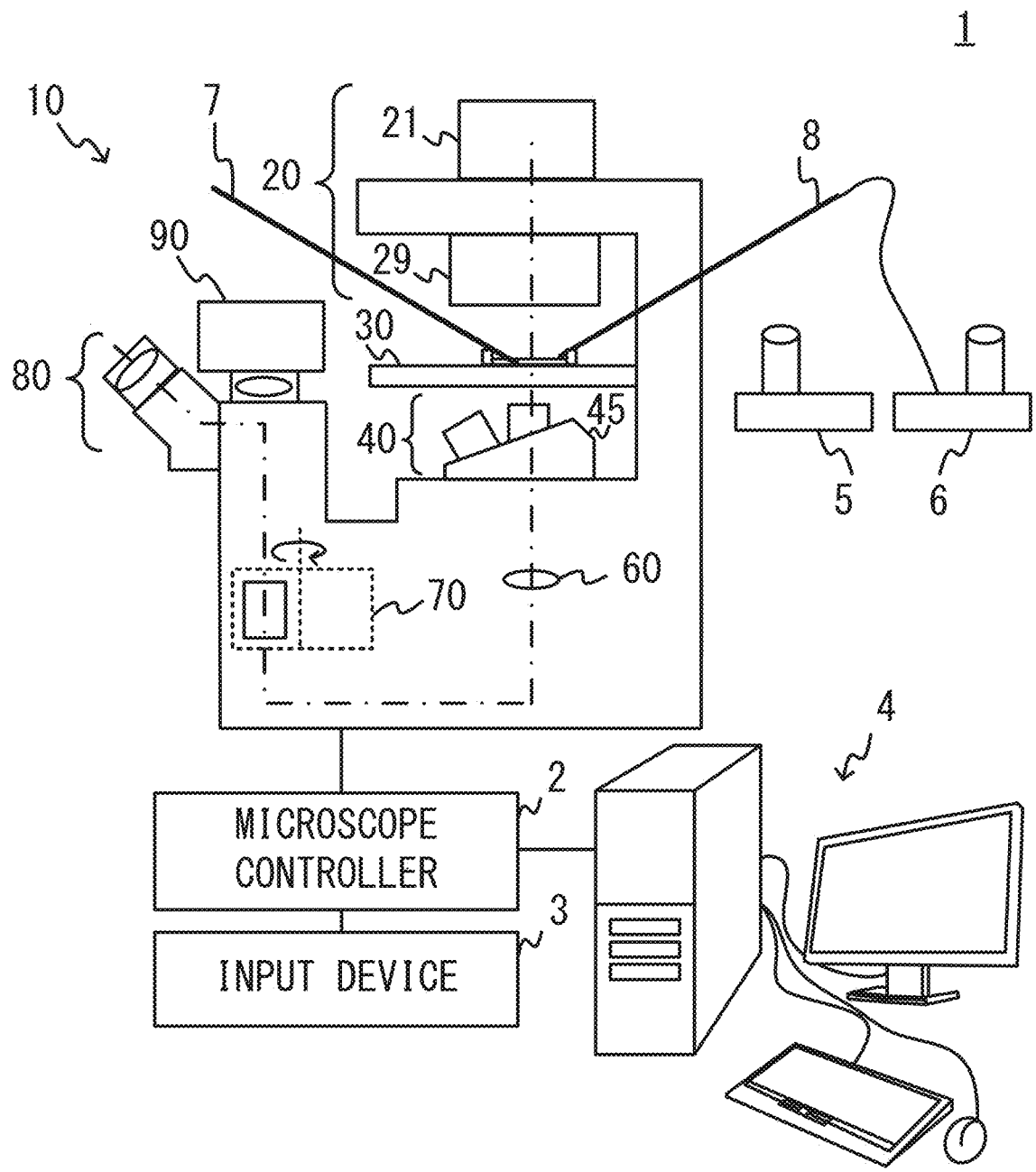
FIG. 1 is a diagram exemplifying a configuration of a microscopic system 1.
Figure 2:
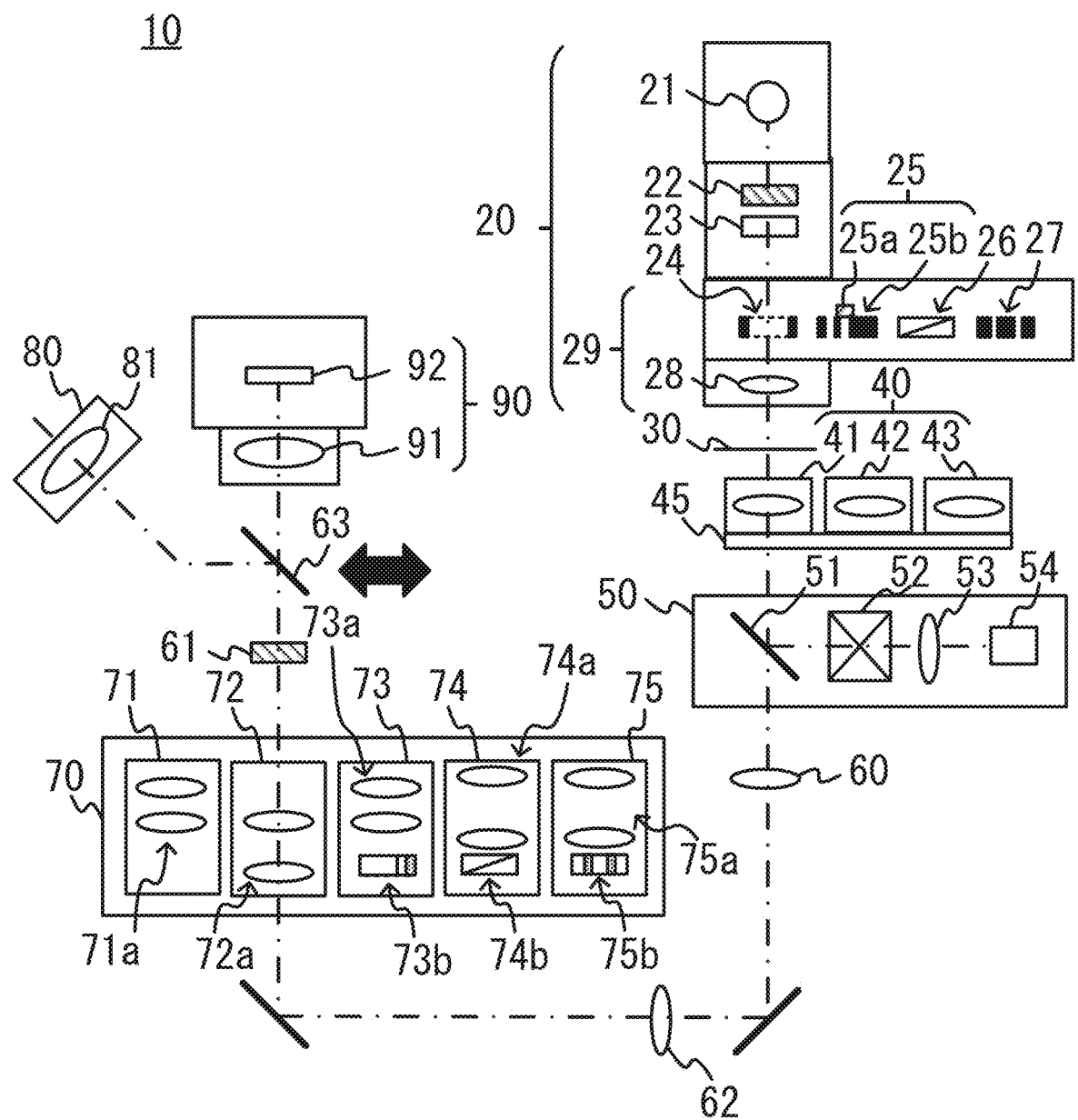
FIG. 2 is a diagram exemplifying a configuration of a microscope 10.
Figure 3:
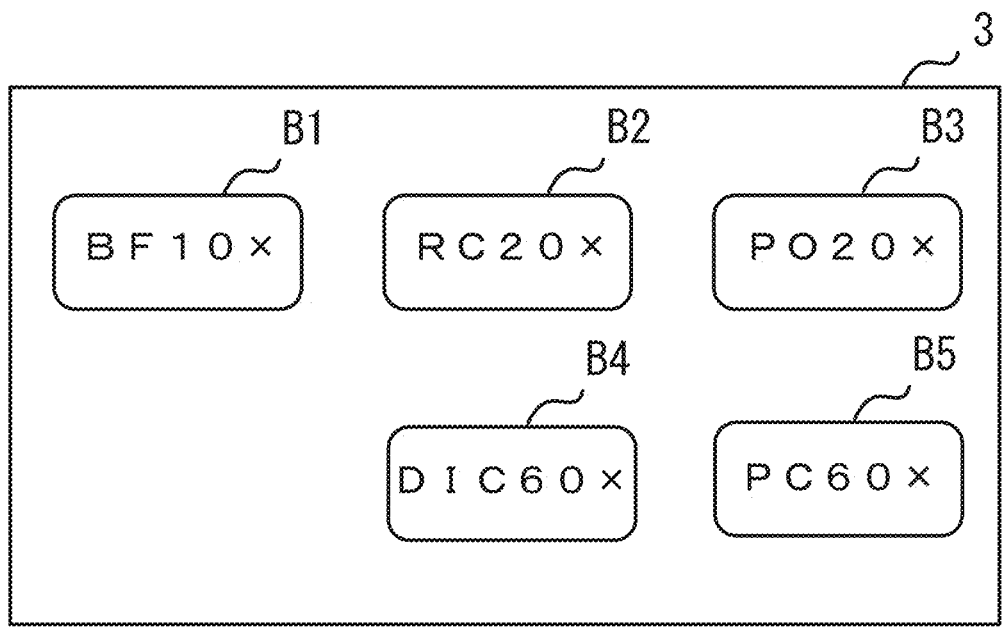
FIG. 3 is a diagram exemplifying a configuration of an operation unit of an input device 3.

FIG. 1 is a diagram exemplifying a configuration of a microscopic system 1. FIG. 2 is a diagram exemplifying a configuration of a microscope 10. FIG. 3 is a diagram exemplifying a configuration of an operation unit of an input device 3. FIG. 4 is a diagram exemplifying a relationship among a predetermined magnification for each of the microscopies, a magnification of an objective, and a magnification (intermediate variable magnification) of a magnification adjustment device.

The microscopic system 1 illustrated in FIG. 1 is a microscopic system used in the micro insemination or the like, and includes the microscope 10 to be used in multiple microscopies. A user of the microscopic system 1 is not particularly limited, but is, for example, an embryologist. Specimens set as observation objects by the microscopic system 1 are, for example, reproductive cells such as sperm and an egg accommodated in a Petri dish which are phase objects.

The microscope 10 includes at least an objective 40 used in common in the multiple microscopies, and a magnification adjustment device 70 that is an example of a magnification adjustment unit configured to adjust an optical magnification of the microscope 10 in response to switching of the multiple microscopies. As illustrated in FIG. 1, the magnification adjustment device 70 is a device different from a revolver 45 configured to switch the objective 40, and is arranged on an image side of the objective 40. It is noted that in the present specification, "to adjust" means that an object to be adjusted is changed when necessary and is not changed when unnecessary.

Herein, the microscopy refers to an observation method using the microscope, and is also referred to as a microscopic method. Representative microscopies include a bright field (BF) microscopy, a dark field (DF) microscopy, a polarized light (PO) microscopy, a phase contrast (PC) microscopy, a differential interference contrast (DIC) microscopy, a fluorescence (FL) microscopy, a relief contrast (RC) microscopy, and the like. It is noted that the relief contrast (RC) microscopy is also referred to as a modulation contrast (MC) microscopy.

In addition, the optical magnification of the microscope 10 refers to a magnification of an optical image of a specimen which is formed by the microscope 10, and indicates the number of times the optical image to be formed is as large as the specimen. The optical magnification of the microscope 10 may be, for example, an observation magnification (total magnification) in an eyepiece barrel 80 provided in the microscope 10, or may be a magnification on an imaging surface of an imaging device 90 provided in the microscope 10. It is noted that an observation magnification (total magnification) on a monitor of a computer 4 included in the microscopic system 1 is obtained by multiplying the magnification on the imaging surface by the monitor magnification. Therefore, in the microscopic system 1, when the magnification adjustment device 70 adjusts the optical magnification of the microscope 10, the observation magnification is also adjusted at the same time.

In the micro insemination, as will be described below, an observation object or an observation purpose is different for each of the microscopies to be used. For this reason, in general, when the embryologist switches the microscopies, the observation magnifications are also to be switched. It is noted that the observation magnification used for each of the microscopies is restricted by the observation object and the observation purpose in the microscopy, and is accordingly broadly fixed. Therefore, the optical magnification of the microscope 10 corresponding to the observation magnification is also broadly fixed. Under such a situation, when the microscope 10 according to the present embodiment is used, the magnification adjustment device 70 can appropriately adjust the optical magnification of the microscope 10 in response to the switching of the multiple microscopies. Specifically, for example, when the optical magnification of the microscope 10 is different from a predetermined magnification for the microscopy after the switching, the magnification adjustment device 70 may set the optical magnification of the microscope 10 to be close to the predetermined magnification, or more preferably, may change the optical magnification of the microscope 10 to the predetermined magnification. When the predetermined magnification for each of the microscopies is appropriately set, since the embryologist does not need to switch the observation magnifications by a separate operation from the switching operation of the microscopies, the microscopic operations in the micro insemination can be simplified.

Furthermore, in the microscope 10, the objective 40 is used in common in the multiple microscopies, and the adjustment of the optical magnification of the microscope 10 is performed by the magnification adjustment device 70 on the image side relative to the objective 40. That is, at the time of the switching of the microscopies, the switching of the objective 40 does not occur. Thus, since the deviation from the accurate focus, shift of the center of the field of view, or the like due to the switching of the objective 40 does not occur, the amount of adjustment work to be performed after the switching of the microscopies and the observation magnifications can be suppressed.

In this manner, in the microscope 10, the work necessary for the switching itself of the microscopies and the observation magnifications can be simplified, and also the adjustment work after the switching can be simplified. Therefore, in accordance with the microscope 10, the microscopies and the observation magnifications can be promptly switched, and also the observation of the specimen can be promptly started in the microscopy after the switching.

Hereinafter, with reference to FIG. 1 to FIG. 4, a specific example of the configuration of the microscopic system 1 will be described in detail. As illustrated in FIG. 1, the microscopic system 1 includes the microscope 10, a microscope controller 2 configured to control the microscope 10, and the input device 3 configured to switch the microscopies. As illustrated in FIG. 1, the microscopic system 1 may further include the computer 4 configured to receive an image obtained by the microscope 10.

The microscope controller 2 is a control device configured to control the microscope 10 according to operations performed by the embryologist using the input device 3 and the computer 4. The microscope controller 2 may perform, for example, rotation control of a turret of a universal condenser 29 included in the microscope 10 and a turret of the magnification adjustment device 70, or may perform light emission control of a light source device 21. The microscope controller 2 may output an image obtained by the microscope 10 to the computer 4, or may output the image to a monitor provided instead of the computer 4.

The input device 3 is a hand switch device configured to change settings related to the microscopies and the observation magnifications. As illustrated in FIG. 3, the input device 3 has five buttons (a button B1 to a button B5) respectively corresponding to the multiple microscopies, for example. In the microscopic system 1, when the button of the input device 3 is pressed, the turret of the universal condenser 29 and the turret of the magnification adjustment device 70 rotate, and the settings related to the microscopies and the observation magnifications are switched according to the pressed button. For this reason, when the embryologist simply presses any of these buttons, the settings related to the microscopies and the observation magnifications can be promptly switched.

The computer 4 includes at least a processor and a memory. The computer 4 may be a general use device such as a personal computer, or may be a computer dedicated to the microscopic system 1. As illustrated in FIG. 1, the computer 4 may include a monitor, and may display the image obtained by the microscope 10 on the monitor.

It is noted that a configuration may be adopted where the microscopic system 1 does not include the computer 4. The computer 4 is not necessarily needed, and the image obtained by the microscope 10 may be displayed on the monitor connected to the microscope controller 2. In addition, a configuration may be adopted where the microscopic system 1 does not include the monitor, and the embryologist may perform eye observation of the specimen via the eyepiece barrel 80 described below which is included in the microscope 10, and operate the input device 3. In addition, the computer 4 may have a function of the input device 3, and when the input device 3 described above is operated, an instruction input to the microscope controller 2 may be input from the computer 4 to the microscope controller 2.

As illustrated in FIG. 1, the microscopic system 1 may include a manipulator including a pair of pipettes (a pipette 7 and a pipette 8) to be operated by left and right handles (a handle 5 and a handle 6). The manipulator is used to assist the work of the micro insemination by the embryologist.

The microscope 10 is an inverted microscope including a transmitted illumination system 20 above a stage 30. A plurality of objectives 40 forming the optical image of the specimen by a combination with a tube lens 60 are attached to the revolver 45. Furthermore, the microscope 10 includes the eyepiece barrel 80 and the imaging device 90, and can support the eye observation and digital imaging of the specimen.

As will be described below, the microscope 10 includes a modulation optical element configured to visualize an unstained phase object which is removably inserted into each of an illumination optical path and an observation optical path. When the modulation optical element according to the microscopy is inserted into and removed from the optical path, the embryologist can observe the phase object by the microscope 10 while switching the multiple microscopies.

It is noted that the microscope 10 can support five microscopies including the bright field microscopy, the relief contrast microscopy, the differential interference contrast microscopy, the phase contrast microscopy, and the polarized light microscopy. It is noted however that the microscopies that can be supported by the microscope 10 are not limited to the above described examples, and may include other microscopies such as the fluorescence microscopy and the dark field microscopy. In addition, to be used in the micro insemination, the microscope 10 desirably supports at least the bright field microscopy, the relief contrast microscopy, and the differential interference contrast microscopy or the phase contrast microscopy, and furthermore, the microscope 10 more desirably supports the polarized light microscopy. In the micro insemination, the bright field microscopy is used when positioning of the specimen and positioning of the pipettes are performed by using an objective with a low magnification such as 4× or 10×. In addition, the relief contrast microscopy is used when form observation of the egg and motility check of the sperm (specifically, whether or not the sperm swims fast and straight) are performed by using an objective with a magnification such as 20× or 40×. The differential interference contrast microscopy is used when the observation of the sperm is performed to see whether or not a head part of the sperm has a defect by using an objective with a high magnification such as 60×. The polarized light microscopy is used when a spindle having polarization property which appears in a mature egg is observed by using an objective with a magnification such as 20× or 40×.

The transmitted illumination system 20 illuminates the specimen placed on the stage 30 with light from above the stage 30. As illustrated in FIG. 1 and FIG. 2, the transmitted illumination system 20 includes the light source device 21 and the universal condenser 29. Furthermore, as illustrated in FIG. 2, the transmitted illumination system 20 includes a polarizer 22 and a compensator 23 between the light source device 21 configured to emit illumination light and the universal condenser 29.

The light source device 21 may include, for example, a light emitting diode (LED) light source, or may include a halogen lamp. The polarizer 22 is a modulation optical element configured to take out linear polarized light having a particular oscillation direction, and is mainly used in the relief contrast microscopy, the differential interference contrast microscopy, and the polarized light microscopy in the microscope 10. In the bright field microscopy (and the phase contrast microscopy), the polarizer 22 may be removed from the optical path. It is noted that the polarizer 22 is rotatably arranged in the microscope 10 such that an oscillation direction that the polarizer 22 itself has is changed relative to an oscillation direction that an analyzer 61 described below (see FIG. 2) or a polarization plate 25a described below (see FIG. 2) has.

The compensator 23 is a modulation optical element used for measuring retardation due to birefringence of the specimen. The compensator 23 is, for example, a Senarmont compensator, a liquid crystal modulation element, or a Broce-Kohler compensator. In the microscope 10, the compensator 23 is used in the polarized light microscopy for adjusting a contrast of the image by changing the retardation caused in the compensator 23. In the bright field microscopy, the relief contrast microscopy, and the differential interference contrast microscopy (and the phase contrast microscopy), the compensator 23 may be removed from the optical path.

As illustrated in FIG. 2, the universal condenser 29 includes a plurality of modulation optical elements accommodated in the turret and a condenser lens 28. The plurality of modulation optical elements include a modulator 25 for the relief contrast microscopy, a differential interference contrast (DIC) prism 26, and a ring slit plate 27. The plurality of these modulation optical elements and an apertured plate 24 are used by being switched by the rotation of the turret according to the microscopy.

It is noted that the apertured plate 24 is a so-called hollow hole of the turret, and represents a slot of the turret where the modulation optical element is not arranged. The apertured plate 24 is used in the bright field microscopy and the polarized light microscopy. The modulator 25 is obtained by combining a rectangular slit plate 25b in which a rectangular slit is formed with the polarization plate 25a arranged to cover a part of the slit. The modulator 25 is used in the relief contrast microscopy. The DIC prism 26 is used in the differential interference contrast microscopy. The ring slit plate 27 in which a ring shaped slit is formed is used in the phase contrast microscopy. It is noted that the modulator 25, the DIC prism 26, and the ring slit plate 27 are inserted into and removed from a pupil surface (entrance pupil, front focal position) of the condenser lens 28, for example, by the rotation of the turret.

As illustrated in FIG. 2, a plurality of the objectives 40 (an objective 41, an objective 42, and an objective 43) are provided below the stage 30 to be switchable by the revolver 45. The objectives 40 form the optical image of the specimen by a combination with the tube lens 60. Furthermore, a relay lens 62 and the analyzer 61 are provided on the optical path on the image side of the tube lens 60.

It is noted that the analyzer 61 is the modulation optical element configured to take out linear polarized light having a particular oscillation direction similarly as in the polarizer 22, and is mainly used in the differential interference contrast microscopy and the polarized light microscopy in the microscope 10. In the bright field microscopy and the relief contrast microscopy (and the phase contrast microscopy), the analyzer 61 may be removed from the optical path, or an orientation of the polarizer 22 or the analyzer 61 may be adjusted such that the polarizer 22 and the analyzer 61 have a parallel Nicol relationship. It is noted that similarly as in the polarizer 22, the analyzer 61 may be rotatably arranged in the microscope 10 to change the oscillation direction that the analyzer 61 itself has relative to the oscillation direction that the polarizer 22 has. In addition, the analyzer 61 may be provided in an optical unit included in the magnification adjustment device 70 which will be described below. For example, the analyzer 61 may be provided in an optical unit 71 which is an optical unit corresponding to the polarized light microscopy and an optical unit 74 which is an optical unit corresponding to the differential interference contrast microscopy.

At least one of the plurality of objectives 40 is used in common in the multiple microscopies. The objective used in common in the multiple microscopies is not particularly limited. Hereinafter, a case will be described as an example in which an objective with the magnification of 20× (for example, the objective 41) is used in common in the multiple microscopies, but a plurality of objectives used in common may be attached to the revolver 45. It is noted that in this example, the objective 41 is an objective at 20× with a numerical aperture of 0.7, but instead of the objective 41, for example, the objective 42 that is an objective at 10× with the numerical aperture of 0.7 may be used in common in the multiple microscopies. The numerical aperture of 0.7 is a numerical aperture having a sufficient resolution even when a form of the sperm (for example, an internal section of the head part of the sperm) is observed at the observation magnification that is higher than or equal to 60×.

As illustrated in FIG. 2, the magnification adjustment device 70 includes a plurality of optical units (the optical unit 71, an optical unit 72, an optical unit 73, the optical unit 74, and an optical unit 75) corresponding to the multiple microscopies, and the turret that is a switching device configured to switch the plurality of optical units.

The optical unit 71 is an optical unit corresponding to the polarized light microscopy, and is inserted onto the optical path when the specimen is observed in the polarized light (PO) microscopy. An optical system 71a configured to adjust the optical magnification of the microscope 10 is included in the optical unit 71. A magnification of the optical system 71a is previously determined such that the optical magnification of the microscope 10 is set as a predetermined magnification frequently used in the polarized light microscopy in the micro insemination. Specifically, since the polarized light microscopy is used for checking the spindle of the egg as will be described below, the predetermined magnification for the polarized light microscopy is, for example, 20× which is suitable to an observation of a structure of the egg as illustrated in FIG. 4. Therefore, when the objective 40 at 20× is used in common in the multiple microscopies, the magnification of the optical system 71a is 1×. It is noted that the optical unit 71 may further include an analyzer, and in this case, the analyzer 61 between the magnification adjustment device 70 and a mirror 63 may be omitted. When the analyzer is included in the optical unit 71 and the analyzer 61 is omitted, the brighter observation than before can be performed in the microscopies in which the analyzer is not needed (the bright field microscopy, the relied contrast microscopy, and the phase contrast microscopy).

The optical unit 72 is an optical unit corresponding to the bright field microscopy, and is inserted onto the optical path when the specimen is observed in the bright field (BF) microscopy. An optical system 72a configured to adjust the optical magnification of the microscope 10 is included in the optical unit 72. A magnification of the optical system 72a is previously determined such that the optical magnification of the microscope 10 is set as a predetermined magnification frequently used in the bright field microscopy in the micro insemination. Specifically, the bright field microscopy is used for search of a drop in a Petri dish, alignment of the pipette, and the like. For this reason, the predetermined magnification for the bright field microscopy is a relatively low magnification to secure a wide field of view, and is, for example, 10× as illustrated in FIG. 4. Therefore, when the objective 40 at 20X is used in common in the multiple microscopies, the magnification of the optical system 72a is at 0.5×, and is below 1×.

The optical unit 73 is an optical unit corresponding to the relief contrast microscopy, and is inserted onto the optical path when the specimen is observed in the relief contrast (RC) microscopy. An optical system 73a configured to adjust the optical magnification of the microscope 10 and a modulator 73b for the relief contrast microscopy are included in the optical unit 73. A magnification of the optical system 73a is previously determined such that the optical magnification of the microscope 10 is set as a predetermined magnification frequently used in the relief contrast microscopy in the micro insemination. Specifically, the relief contrast microscopy is used for checking an entire shape of the sperm, the motility of the sperm, and furthermore, a first polar body of the egg as will be described below. For this reason, the predetermined magnification for the relief contrast microscopy is, for example, 20× suitable for the observation of the structure of the egg and the movement of the sperm as illustrated in FIG. 4. Therefore, when the objective 40 at 20× is used in common in the multiple microscopies, the magnification of the optical system 73a is 1×. The modulator 73b includes three areas having different types of transmittance (for example, an area with the transmittance of approximately 100%, an area with the transmittance of approximately 5%, and an area with the transmittance of approximately 0%). The modulator 73b is a modulation optical element paired with the modulator 25 accommodated in the universal condenser 29, and is used in the relief contrast microscopy together with the modulator 25.

The optical unit 74 is an optical unit corresponding to the differential interference contrast microscopy, and is inserted onto the optical path when the specimen is observed in the differential interference contrast (DIC) microscopy. An optical system 74a configured to adjust the optical magnification of the microscope 10 and a DIC prism 74b are included in the optical unit 74. A magnification of the optical system 74a is previously determined such that the optical magnification of the microscope 10 is set as a predetermined magnification frequently used in the differential interference contrast microscopy in the micro insemination. Specifically, the differential interference contrast microscopy is used for observing a vacuole in the sperm as will be described below. For this reason, the predetermined magnification for the differential interference contrast microscopy is a relatively high magnification, and is, for example, 60× suitable for the observation of the sperm structure as illustrated in FIG. 4. Therefore, when the objective 40 at 20× is used in common in the multiple microscopies, the magnification of the optical system 74*a* is 3×, and is a magnification above 1×. The DIC prism 74*b* is a modulation optical element paired with the DIC prism 26 accommodated in the universal condenser 29, and is used in the differential interference contrast microscopy together with the DIC prism 26. It is noted that the optical unit 74 may further include an analyzer, and in this case, the analyzer 61 between the magnification adjustment device 70 and the mirror 63 may be omitted. When the analyzer is included in the optical unit 74 and the analyzer 61 is omitted, the brighter observation than before can be performed in the microscopies in which the analyzer is not needed (the bright field microscopy, the relied contrast microscopy, and the phase contrast microscopy).

The optical unit 75 is an optical unit corresponding to the phase contrast microscopy, and is inserted onto the optical path when the specimen is observed in the phase contrast (PC) microscopy. An optical system 75*a* configured to adjust the optical magnification of the microscope 10 and a phase plate 75*b* are included in the optical unit 75. A magnification of the optical system 75*a* is previously determined such that the optical magnification of the microscope 10 is set as a predetermined magnification frequently used in the phase contrast microscopy in the micro insemination. Specifically, the phase contrast microscopy is used to observe the vacuole in the sperm similarly as in the differential interference contrast microscopy. For this reason, the predetermined magnification for the phase contrast microscopy is a relatively high magnification, and is, for example, 60× suitable for the observation of the sperm structure as illustrated in FIG. 4. Therefore, when the objective 40 at 20× is used in common in the multiple microscopies, the magnification of the optical system 75*a* is 3×, and is a magnification above 1×. The phase plate 75*b* is a modulation optical element paired with the ring slit plate 27 accommodated in the universal condenser 29, and is used together with the ring slit plate 27 in the phase contrast microscopy.

As described above, each of the plurality of optical units includes at least one of the optical system and the modulation optical element according to the microscopy corresponding to the optical unit. In addition, the optical system included in the optical unit has a magnification according to a magnification ratio (the predetermined magnification/the magnification of the objective) between the magnification of the objective 40 and the predetermined magnification for the microscopy corresponding to the optical unit.

In this example, the optical unit 71 and the optical unit 72 include only the optical system. That is, only the optical system is accommodated in each of the casings of the optical unit 71 and the optical unit 72. In addition, the optical unit 73, the optical unit 74, and the optical unit 75 include both the optical system and the modulation optical element. That is, both the optical system and the modulation optical element are accommodated in each of the casings of the optical unit 73, the optical unit 74, and the optical unit 75. It is noted however that the plurality of optical units may include optical units including only the modulation optical element, and each of the plurality of optical units may include a casing that accommodates together at least one of the optical system and the modulation optical element.

The magnification adjustment device 70 is arranged between the tube lens 60 arranged on the image side of the objective 40 and the eyepiece barrel 80 (and the imaging device 90). Specifically, the magnification adjustment device 70 is arranged between the relay lens 62 and the mirror 63 such that a pupil modulation element (the modulator 73*b*, the DIC prism 74*b*, the phase plate 75*b*, or the like) included in the optical unit can be arranged on a plane optically conjugated to a pupil surface (exit pupil, rear focal position) of the objective 40. It is noted that the mirror 63 is a mirror arranged to be removably inserted into the optical path, and is used for switching between eye observation and digital imaging. To be still more specific, the magnification adjustment device 70 is arranged between the relay lens 62 and the analyzer 61 such that the DIC prism 74*b* included in the optical unit 74 is inserted onto the optical path between the polarizer 22 arranged on the illumination optical path and the analyzer 61 arranged on the observation optical path. With the aforementioned arrangement, the magnification adjustment device 70 adjusts the optical magnification of the microscope 10 on the optical path on the image side relative to the tube lens 60.

The magnification adjustment device 70 having the above described configuration switches the optical unit to be arranged on the optical path according to the microscopy by the switching device. Thus, the magnification adjustment device 70 can adjust the optical magnification of the microscope 10 on the optical path on the image side relative to the tube lens 60 and also perform the switching of the multiple microscopies. That is, the magnification adjustment device 70 can perform the switching of the multiple microscopies and the adjustment of the optical magnification of the microscope 10 at once by switching the plurality of optical units.

It is noted that the magnifications described above with regard to the optical systems included in the plurality of optical units are merely examples. It is sufficient when the magnification is appropriate to an observation object and a purpose in each of the microscopies. For example, it is sufficient when the predetermined magnification for the bright field microscopy (first predetermined magnification) is lower than the predetermined magnification for the differential interference contrast microscopy or the phase contrast microscopy (second predetermined magnification). Therefore, it is sufficient when the magnification of the optical system 72*a* is lower than the magnification of the optical system 74*a* or the optical system 75*a*. In addition, for example, it is sufficient when the predetermined magnification for the relief contrast microscopy (third predetermined magnification) is higher than the predetermined magnification for the bright field microscopy (first predetermined magnification) and lower than the predetermined magnification for the differential interference contrast microscopy or the phase contrast microscopy (second predetermined magnification). Therefore, it is sufficient when the magnification of the optical system 73*a* is higher than the magnification of the optical system 72*a* and lower than the magnification of the optical system 74*a* or the optical system 75*a*. In addition, for example, it is sufficient when the predetermined magnification for the polarized light microscopy (fourth predetermined magnification) is higher than the predetermined magnification for the bright field microscopy (first predetermined magnification) and lower than the predetermined magnification for the differential interference contrast microscopy or the phase contrast microscopy (second predetermined magnification). More specifically, the predetermined magnification for the polarized light microscopy (fourth predetermined magnification) may be equal to the predetermined magnification for the relief contrast microscopy (third predetermined magnification). Therefore, it is sufficient when the magnification of the optical system 71a is higher than the magnification of the optical system 72a and lower than the magnification of the optical system 74a or the optical system 75a, and may be equal to the magnification of the optical system 73a.

In addition, the example has been illustrated in which the magnification adjustment device 70 adjusts the optical magnification of the microscope 10 from 10× to 60×, but such an adjustment range of the optical magnification is also merely an example. The magnification ratio of an upper limit value to a lower limit value of the optical magnification may be below the aforementioned 6 to 1. It is noted however that it is sufficient that the optical magnification is adjusted such that various observation objects in the micro insemination can be appropriately observed. To do so, the magnification adjustment device 70 desirably adjusts the optical magnification in an adjustment range in which the magnification ratio of the upper limit value to the lower limit value of the optical magnification is 3 or higher to 1.

In addition, as described above, the magnification adjustment device 70 desirably adjusts the optical magnification of the microscope 10 from a magnification lower than the optical magnification of the objective 40 (in this example, 10×) to a magnification higher than the optical magnification of the objective 40 (in this example, 60×). Specifically, in response to switching to a predetermined microscopy, the magnification adjustment device 70 desirably adjusts the optical magnification of the microscope 10 to a magnification at which it is possible to observe a range wider than a range on a specimen surface set by the magnification of the objective 40 and an objective field number (OFN) of the objective (for example, Φ1.1 mm when the OFN of the objective at 20× is 22). More specifically, for example, in response to the switching to the bright field microscopy, the magnification adjustment device 70 desirably sets an intermediate variable magnification of 1× or below. Thus, while the objective having a sufficient resolution is used in common in the multiple microscopies, the wide field of view can be secured.

The eyepiece barrel 80 and the imaging device 90 are arranged in a stage after the mirror 63 for switching between the eye observation and the digital imaging. When the mirror 63 is inserted into the optical path, the light is guided to the eyepiece barrel 80, and when the mirror 63 is removed from the optical path, the light is guided to the imaging device 90. The eyepiece barrel 80 includes an eyepiece lens 81. In addition, the imaging device 90 includes an adapter lens 91 and an imaging element 92. The imaging element 92 is, for example, a charge coupled device (CCD) image sensor, a complementary metal-oxide-semiconductor (CMOS) image sensor, or the like.

The description has been provided above while the case is supposed where magnifications of the eyepiece lens 81 and the adapter lens 91 are both 1×, but the magnifications of the eyepiece lens 81 and the adapter lens 91 are not particularly limited. Since the magnification of the eyepiece lens 81 (the adapter lens 91) affects the optical magnification of the microscope 10, the magnification adjustment device 70 may adjust the optical magnification by taking into account the magnification of the eyepiece lens 81 (the adapter lens 91).

Furthermore, as illustrated in FIG. 2, the microscope 10 may include a laser assisted hatching unit 50. The laser assisted hatching unit 50 irradiates the specimen with laser light by introducing the laser light to the optical path from a position between the objective 40 and the tube lens 60. More specifically, the laser assisted hatching unit 50 is used to irradiate zona pellucida surrounding an embryo with the laser light to reduce a thickness of a part of the zona pellucida or cut out the zona pellucida such that, for example, the embryo grown from the fertilized egg can be implanted. The laser assisted hatching unit 50 includes a splitter 51, a scanner 52, a lens 53, and laser 54. The splitter 51 is, for example, a dichroic mirror. The scanner 52 is, for example, a galvanometer scanner, and is configured to adjust an irradiation position of the laser light in a direction orthogonal to an optical axis of the objective 40. The lens 53 converts the laser light into parallel luminous flux.

Figure 5:
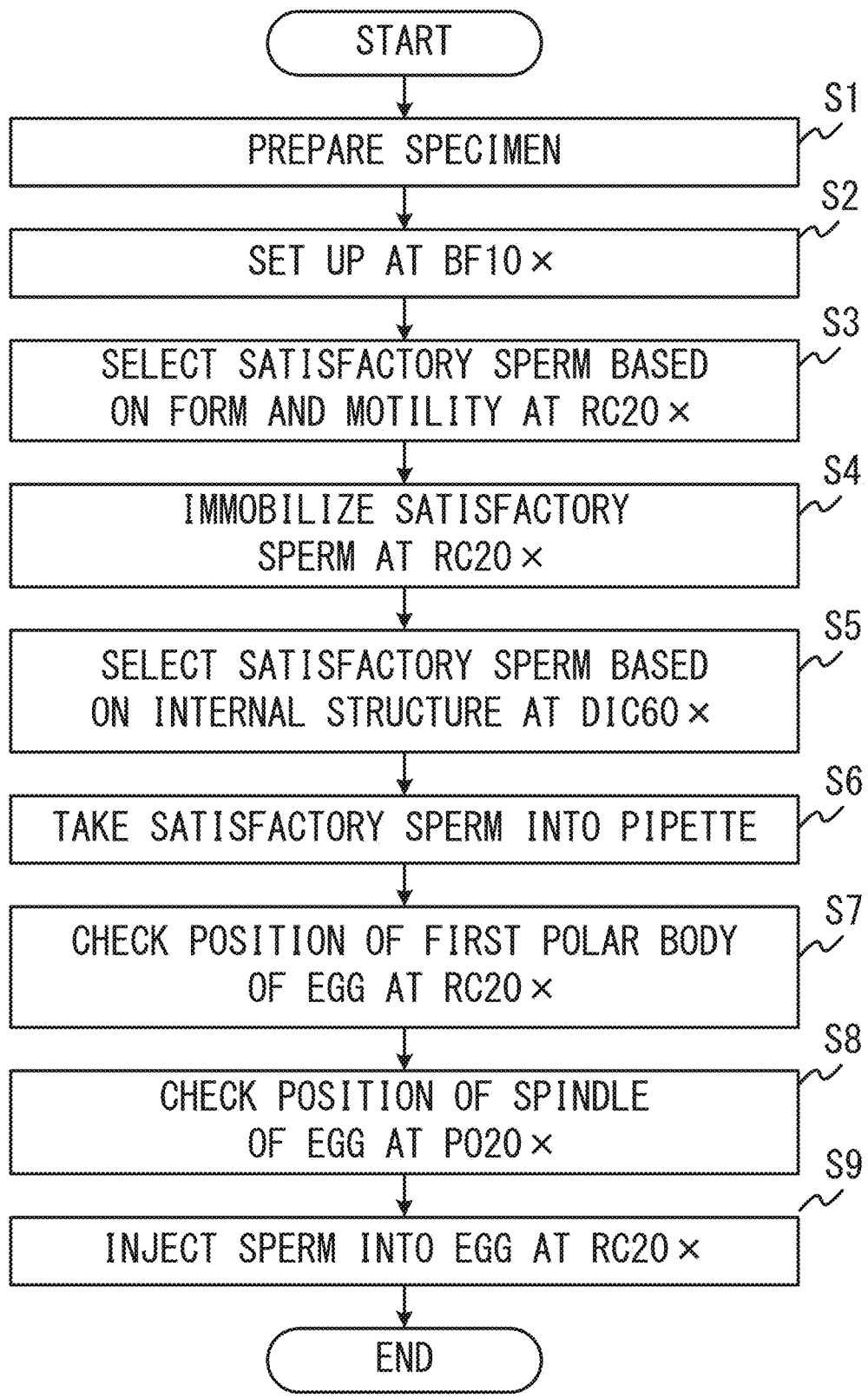
FIG. 5 is a flowchart illustrating an example of a procedure of micro insemination.

FIG. 5 is a flowchart illustrating an example of a procedure of the micro insemination. Hereinafter, with reference to FIG. 5, the procedure of the micro insemination performed by the embryologist using the microscopic system 1 described above and the operation of the microscopic system 1 in the micro insemination will be specifically described.

First, the embryologist prepares a specimen (step S1). At this point, the embryologist creates, for example, the specimen including a plurality of drops in a Petri dish, and arranges the Petri dish on the stage 30. The plurality of drops include a washing drop for washing a pipette, a sperm suspension drop including sperm, an egg operation drop including an egg, and the like. These drops are coated with mineral oil, for example.

Next, the embryologist sets up the microscopic system 1 (step S2). At this point, the embryologist presses the button B1 of the input device 3, for example, and changes the settings of the microscopies and the observation magnifications of the microscopic system 1. The microscope controller 2 that has detected the press of the button B1 controls the microscope 10 to switch the microscopy to the bright field microscopy and switch the optical magnification of the microscope 10 to 10×. More specifically, the microscope 10 rotates the turret of the universal condenser 29 such that the apertured plate 24 is located on the optical path, and furthermore, rotates the turret of the magnification adjustment device 70 such that the optical unit 72 is located on the optical path. Thereafter, the embryologist adjusts positions of the pipette 7 and the pipette 8 by operating the handle 5 and the handle 6 to bring the pipette 7 and the pipette 8 into focus. Furthermore, the stage 30 is moved, and the pipette 7 and the pipette 8 are washed by the washing drop. It is noted that during the observation in the bright field microscopy, the polarizer 22 or the analyzer 61 is adjusted such that the polarizer 22 and the analyzer 61 have a parallel Nicol relationship. It is noted however that when the analyzer 61 between the magnification adjustment device 70 and the mirror 63 is omitted and each of the optical unit 71 and the optical unit 74 includes the analyzer, it is not necessary to perform such an adjustment that the polarizer and the analyzer have a parallel Nicol relationship.

When the setup is completed, the embryologist selects sperm (from step S3 to step S6). First, the embryologist selects satisfactory sperm based on a form and motility (step S3). At this point, the embryologist presses the button B2 of the input device 3, for example, and changes the settings of the microscopies and the observation magnifications of the microscopic system 1. The microscope controller 2 that has detected the press of the button B2 controls the microscope 10 to switch the microscopy to the relief contrast microscopy and switch the optical magnification of the microscope 10 to 20×. More specifically, the microscope 10 rotates the turret of the universal condenser 29 such that the modulator 25 is located on the optical path, and furthermore, rotates the turret of the magnification adjustment device 70 such that the optical unit 73 is located on the optical path. Thereafter, the embryologist moves the stage 30 to move the observation position to the sperm suspension drop, and bring the sperm in the sperm suspension drop into focus, so that the satisfactory sperm suitable for the fertilization is selected. At this point, a quality of the sperm is determined based on the form and the motility of the sperm shaded by the relief contrast microscopy, and the satisfactory sperm is selected based on the determination. At this point, the polarizer 22 is desirably rotated to adjust the contrast.

When the satisfactory sperm is selected based on the form and the motility, the embryologist immobilizes the selected satisfactory sperm (step S4). At this point, the embryologist rubs a tail part of the satisfactory sperm against a bottom surface of the Petri dish with the pipette, and damages the tail part of the satisfactory sperm for the immobilization. It is noted that this work is performed in the relief contrast microscopy at 20× similarly as in step S3.

Thereafter, the embryologist further selects the satisfactory sperm based on an internal structure of the immobilized satisfactory sperm (step S5). At this point, the embryologist presses the button B4 of the input device 3, for example, and changes the settings of the microscopies and the observation magnifications of the microscopic system 1. The microscope controller 2 that has detected the press of the button B4 controls the microscope 10 to switch the microscopy to the differential interference contrast microscopy and switch the optical magnification of the microscope 10 to 60×. More specifically, the microscope 10 rotates the turret of the universal condenser 29 such that the DIC prism 26 is located on the optical path, and furthermore, rotates the turret of the magnification adjustment device 70 such that the optical unit 74 is located on the optical path. Thereafter, the embryologist observes a head part of the immobilized satisfactory sperm in detail, and selects the satisfactory sperm suitable for the fertilization. At this point, the quality of the sperm is determined based on a size of the vacuole existing in the head part which is visualized by the differential interference contrast microscopy, and the satisfactory sperm is selected based on the determination. Specifically, the satisfactory sperm having a small vacuole is selected. It is noted that during the observation in the differential interference contrast microscopy, the polarizer 22 or the analyzer 61 is adjusted such that the polarizer 22 and the analyzer 61 have a cross Nicol relationship.

It is noted that in step S5, the phase contrast microscopy may be used instead of the differential interference contrast microscopy. In this case, the embryologist may press, for example, the button B5 of the input device 3, and change the settings of the microscopies and the observation magnifications of the microscopic system 1. The microscope controller 2 that has detected the press of the button B5 controls the microscope 10 to switch the microscopy to the phase contrast microscopy and switch the optical magnification of the microscope 10 to 60×. More specifically, the microscope 10 rotates the turret of the universal condenser 29 such that the ring slit plate 27 is located on the optical path, and furthermore, rotates the turret of the magnification adjustment device 70 such that the optical unit 75 is located on the optical path. During the observation in the phase contrast microscopy, the polarizer 22 or the analyzer 61 is adjusted such that the polarizer 22 and the analyzer 61 have a parallel Nicol relationship.

Thereafter, the embryologist takes the satisfactory sperm selected in step S5 into injection pipette (the pipette 7) (step S6). Thus, the sperm selection work is completed.

When the selection of the satisfactory sperm is completed, the embryologist checks the egg for preparation of sperm injection (step S7 to step S8). First, the embryologist checks a position of the first polar body of the egg (step S7). At this point, the embryologist presses the button B2 of the input device 3, for example, and changes the settings of the microscopies and the observation magnifications of the microscopic system 1. The microscope controller 2 that has detected the press of the button B2 controls the microscope 10 to switch the microscopy to the relief contrast microscopy and switch the optical magnification of the microscope 10 to 20×. More specifically, the microscope 10 rotates the turret of the universal condenser 29 such that the modulator 25 is located on the optical path, and furthermore, rotates the turret of the magnification adjustment device 70 such that the optical unit 73 is located on the optical path. Thereafter, the embryologist moves the stage 30 to move the observation position to the egg operation drop and bring the egg in the egg operation drop into focus. Furthermore, the position of the first polar body of the egg is checked, and a holding pipette (the pipette 8) is operated to change an orientation of the egg such that the first polar body is located in a 12 o'clock direction or a 6 o'clock direction on the clock face. This is because the spindle checked in step S8 exists in the vicinity of the first polar body with a relatively high probability. In step S7 too, the polarizer 22 is desirably rotated to adjust the contrast.

Thereafter, the embryologist checks the spindle of the egg (step S8). At this point, the embryologist presses the button B3 of the input device 3, for example, and changes the settings of the microscopies and the observation magnifications of the microscopic system 1. The microscope controller 2 that has detected the press of the button B3 controls the microscope 10 to switch the microscopy to the polarized light microscopy, and also maintains the optical magnification of the microscope 10 at 20× as it is. More specifically, the microscope 10 rotates the turret of the universal condenser 29 such that the apertured plate 24 is located on the optical path, and furthermore, rotates the turret of the magnification adjustment device 70 such that the optical unit 71 is located on the optical path. Thus, in the microscope 10, the microscopy is switched, but the optical magnification is maintained without change. Thereafter, the embryologist checks the location of the spindle of the egg and operates the holding pipette (the pipette 8) to change the orientation of the egg such that the spindle is located in the 12 o'clock or 6 o'clock direction. This is because, in step S9 which will be described below, a damage to the spindle is avoided by the injection pipette spearing the egg from a 3 o'clock or 9 o'clock direction. In step S8, the polarizer 22 or the analyzer 61 is desirably adjusted such that the polarizer 22 and the analyzer 61 have a cross Nicol relationship.

Finally, the embryologist injects the sperm into the egg (step S9). At this point, the embryologist presses the button B2 of the input device 3, for example, and changes the settings of the microscopies and the observation magnifications of the microscopic system 1. The microscope controller 2 that has detected the press of the button B2 controls the microscope 10 to switch the microscopy to the relief contrast microscopy, and also maintains the optical magnification of the microscope 10 at 20× as it is. More specifically, the microscope 10 rotates the turret of the universal condenser 29 such that the modulator 25 is located on the optical path, and furthermore, rotates the turret of the magnification adjustment device 70 such that the optical unit 73 is located on the optical path. Thus, in the microscope 10, the microscopy is switched, but the optical magnification is maintained without change. Thereafter, the embryologist holds the egg by sucking by the holding pipette (the pipette 8), and pierces the injection pipette (the pipette 7) into the egg from the 3 o'clock or 9 o'clock direction. Finally, the satisfactory sperm is injected into the inside of the egg from the injection pipette (the pipette 7), and the series of procedures is ended. It is noted that in step S9 too, the polarizer 22 is desirably rotated to adjust the contrast. When the series of procedures illustrated in FIG. 5 is ended, the embryologist returns the egg to which the sperm has been injected to an incubator for culture.

As described above, in accordance with the microscope 10 and the microscopic system 1, it is possible to adjust the observation magnification at the same time and also appropriately by simply performing the switching operation of the microscopies at the time of the switching of the microscopies which frequently occurs in the micro insemination. For this reason, switching to a desired combination of the microscopy and the observation magnification can be performed in a short period of time. In addition, since the adjustment of the observation magnification is performed without the switching of the objective, deviation of the focus or the center of the field of view hardly occurs. For this reason, an advantage that subsequent work can be promptly started after the switching also contributes to shortening of the work hours of the micro insemination. Therefore, in accordance with the microscope 10 and the microscopic system 1, the damage to the reproductive cells can be suppressed to the minimum, and the success rate of the micro insemination can be improved.

Second Embodiment

Figure 6:
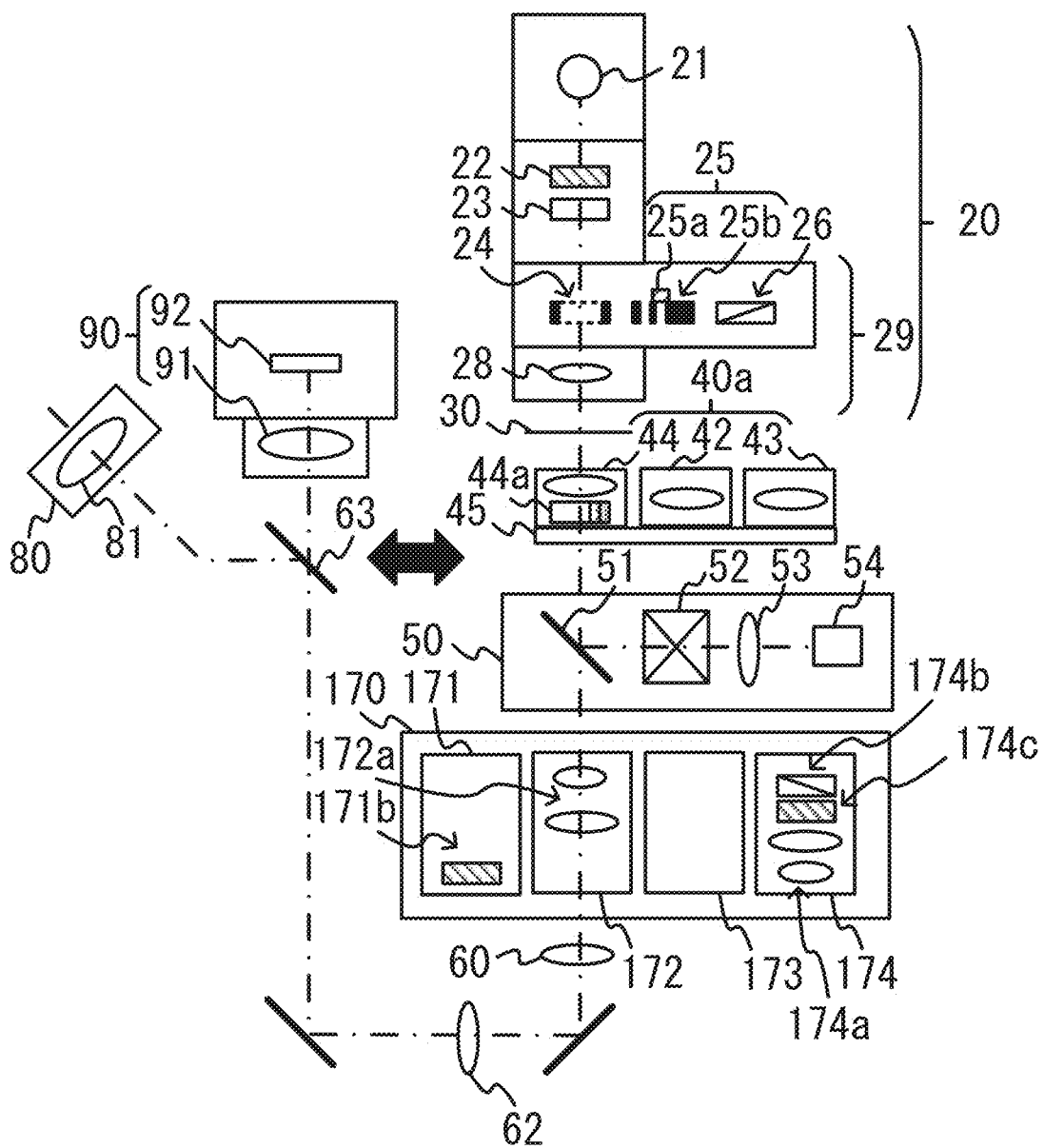
FIG. 6 is a diagram exemplifying a configuration of a microscope 100.

FIG. 6 is a diagram exemplifying a configuration of a microscope 100. A microscopic system according to the present embodiment is different from the microscopic system 1 in that the microscope 100 illustrated in FIG. 6 is included instead of the microscope 10. The rest is similar to the microscopic system 1.

A main difference between the microscope 100 and the microscope 10 is in that the arrangement of the analyzer and the magnification adjustment device is different, that the configuration for the phase contrast microscopy is not included, and that an objective 44 used in common in the multiple microscopies includes a modulator 44a for the relief contrast microscopy. With regard to the arrangement of the analyzer and the magnification adjustment device, more specifically, the microscope 100 is different from the microscope 10 in that the analyzer used in the polarized light microscopy and the differential interference contrast microscopy is arranged in the magnification adjustment device and that the magnification adjustment device is arranged between an objective 40a and the tube lens 60. Hereinafter, the microscope 100 will be described by paying attention to these differences.

As long as the pupil modulation element can be arranged in an exit pupil position of the objective 40a, similarly as in the microscope 10 and the microscopic system 1, the microscope 100 and the microscopic system including the microscope 100 can also adjust the observation magnification at the same time and also appropriately by simply performing the switching operation of the microscopies at the time of the switching of the microscopies which frequently occurs in the micro insemination. Therefore, the work hours of the micro insemination can be shortened. It is noted that according to this embodiment, the modulator 44a for the RC microscopy that is a pupil modulation element is arranged in a pupil position of the objective 44.

A magnification adjustment device 170 included in the microscope 100 is similar to the magnification adjustment device 70 in that a plurality of optical units corresponding to the multiple microscopies are included. An optical unit 171, an optical unit 172, an optical unit 173, and an optical unit 174 are optical units respectively corresponding to the polarized light microscopy, the bright field microscopy, the relief contrast microscopy, and the differential interference contrast microscopy.

The optical unit 171 includes an analyzer 171b. The optical unit 172 includes an optical system 172a having a magnification of 0.5×. The optical unit 173 is an empty unit that does not include an optical element and an optical system. The modulator 44a for the relief contrast microscopy is not arranged in the optical unit 173 but is arranged in the objective 44. The optical unit 174 includes an optical system 174a having a magnification of 3×, a DIC prism 174b, and an analyzer 174c.

In this manner, the plurality of optical units included in the magnification adjustment device 170 are similar to the plurality of optical units included in the magnification adjustment device 70 except for the optical unit 173 in that at least one of the optical system having the magnification according to the magnification ratio between the magnification of the objective 40a and the predetermined magnification for the microscopy corresponding to the optical unit and the modulation optical element according to the microscopy corresponding to the optical unit is included.

Third Embodiment

Figure 7:
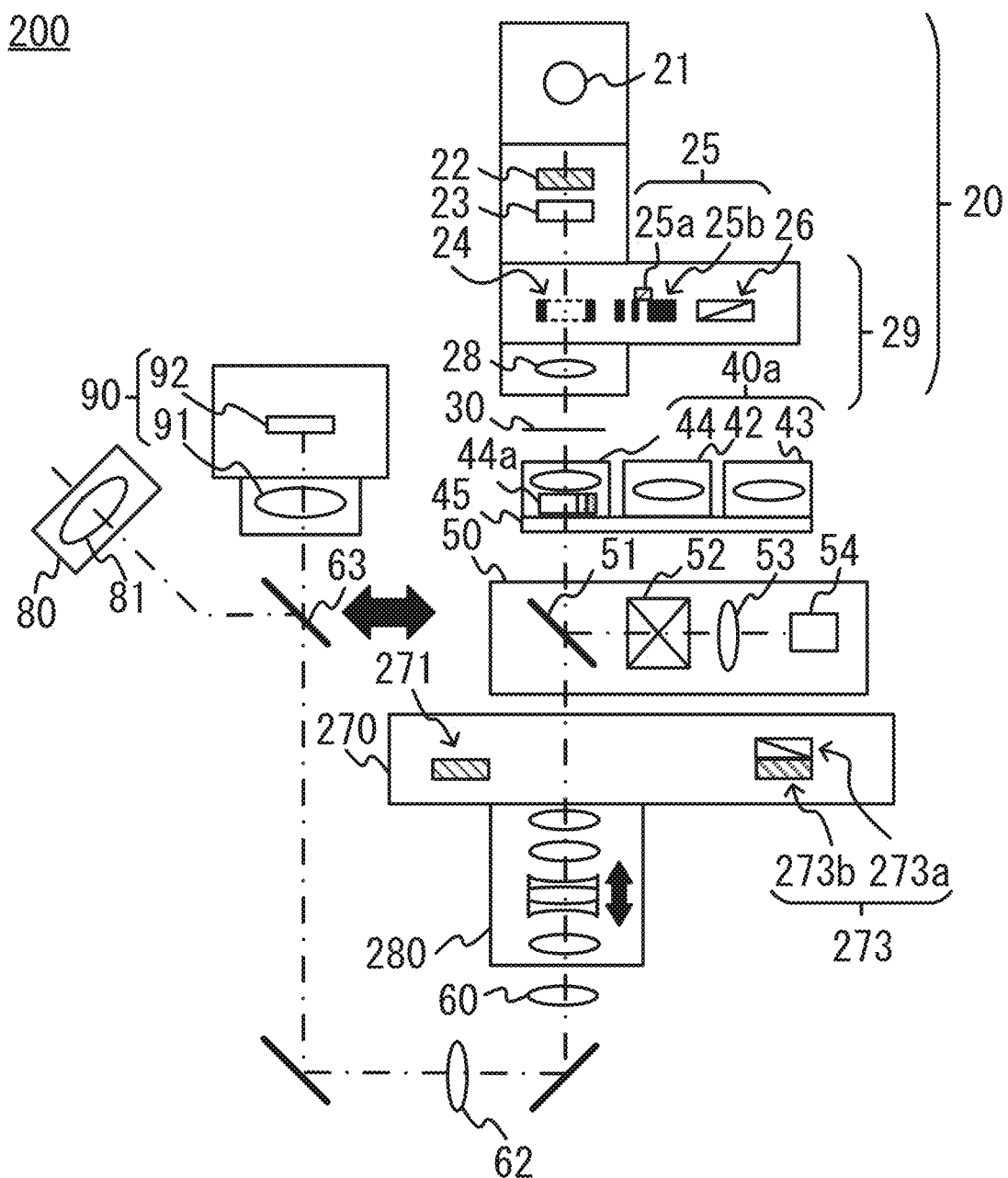
FIG. 7 is a diagram exemplifying a configuration of a microscope 200.

FIG. 7 is a diagram exemplifying a configuration of a microscope 200. A microscopic system according to the present embodiment is different from the microscopic system 1 in that the microscope 200 illustrated in FIG. 7 is included instead of the microscope 10. The rest is similar to the microscopic system 1.

First, the microscope 200 is different from the microscope 10 in that a microscopy switching device 270 configured to switch the multiple microscopies is separately included in addition to a magnification adjustment device 280, that the configuration for the phase contrast microscopy is not included, and the objective 44 used in common in the multiple microscopies includes the modulator 44a for the relief contrast microscopy. It is noted that the microscope 200 is similar to the microscope 100 according to the second embodiment in that the configuration for the phase contrast microscopy is not included and that the objective 44 used in common in the multiple microscopies includes the modulator 44a for the relief contrast microscopy. The microscopy switching device 270 includes one or more modulation optical elements (an analyzer 271 and a modulator 273) each of which is used in at least one of the multiple microscopies and a turret configured to switch these. The microscopy switching device 270 switches the multiple microscopies by inserting and removing at least one of the one or more modulation optical elements into and from the optical path.

Specifically, at the time of switching to the polarized light microscopy, the microscopy switching device 270 may insert the analyzer 271 into the optical path and remove the other modulation optical element from the optical path. In addition, at the time of the switching to the bright field microscopy or the relief contrast microscopy, the microscopy switching device 270 may remove the modulation optical element on the optical path from the optical path. In addition, at the time of switching to the differential interference contrast microscopy, the microscopy switching device 270 may insert the modulator 273 obtained by combining a DIC prism 273a with an analyzer 273b into the optical path and remove the other modulation optical element from the optical path.

Furthermore, the microscope 200 is different from the microscope 10 in that the magnification adjustment device 280 includes a variable magnification optical system. The variable magnification optical system included in the magnification adjustment device 280 has a structure configured to change its own magnification. For example, as illustrated in FIG. 7, the variable magnification optical system may include a zoom lens for changing the magnification by moving the lens that is a part of the variable magnification optical system in an optical axis direction. In addition, the variable magnification optical system may include, for example, a variable focal point lens for changing a focal distance by changing a lens shape.

When the optical magnification of the microscope 200 is different from the predetermined magnification for the microscopy after the switching by the microscopy switching device 270, the magnification adjustment device 280 changes the magnification of the microscope 200 by changing the magnification of the magnification adjustment device 280. Specifically, the microscope 200 may include an interlocking mechanism configured to mechanically interlock the microscopy switching device 270 with the magnification adjustment device 280, and a handle of the magnification adjustment device 280 may be rotated to a predetermined position in response to rotation of the microscopy switching device 270.

In addition, in the microscopic system including the microscope 200, when the microscope controller 2 controls the microscopy switching device 270 and the magnification adjustment device 280, the microscopy switching device 270 may be interlocked with the magnification adjustment device 280 as a result. That is, the microscope controller 2 may control the microscopy switching device 270 and the magnification adjustment device 280 such that the switching of the multiple microscopies by the microscopy switching device 270 and the adjustment of the optical magnification by the magnification adjustment device 280 are interlocked with each other.

As long as the pupil modulation element can be arranged in the exit pupil position of the objective 40a, similarly as in the microscope 10 and the microscopic system 1, the microscope 200 and the microscopic system including the microscope 200 can also adjust the observation magnification at the same time and also appropriately by simply performing the switching operation of the microscopies at the time of the switching of the microscopies which frequently occurs in the micro insemination. Therefore, the work hours of the micro insemination can be shortened. It is noted that according to this embodiment, the modulator 44a for the RC microscopy which is a pupil modulation element is arranged in the pupil position of the objective 44.

Fourth Embodiment

Figure 8:
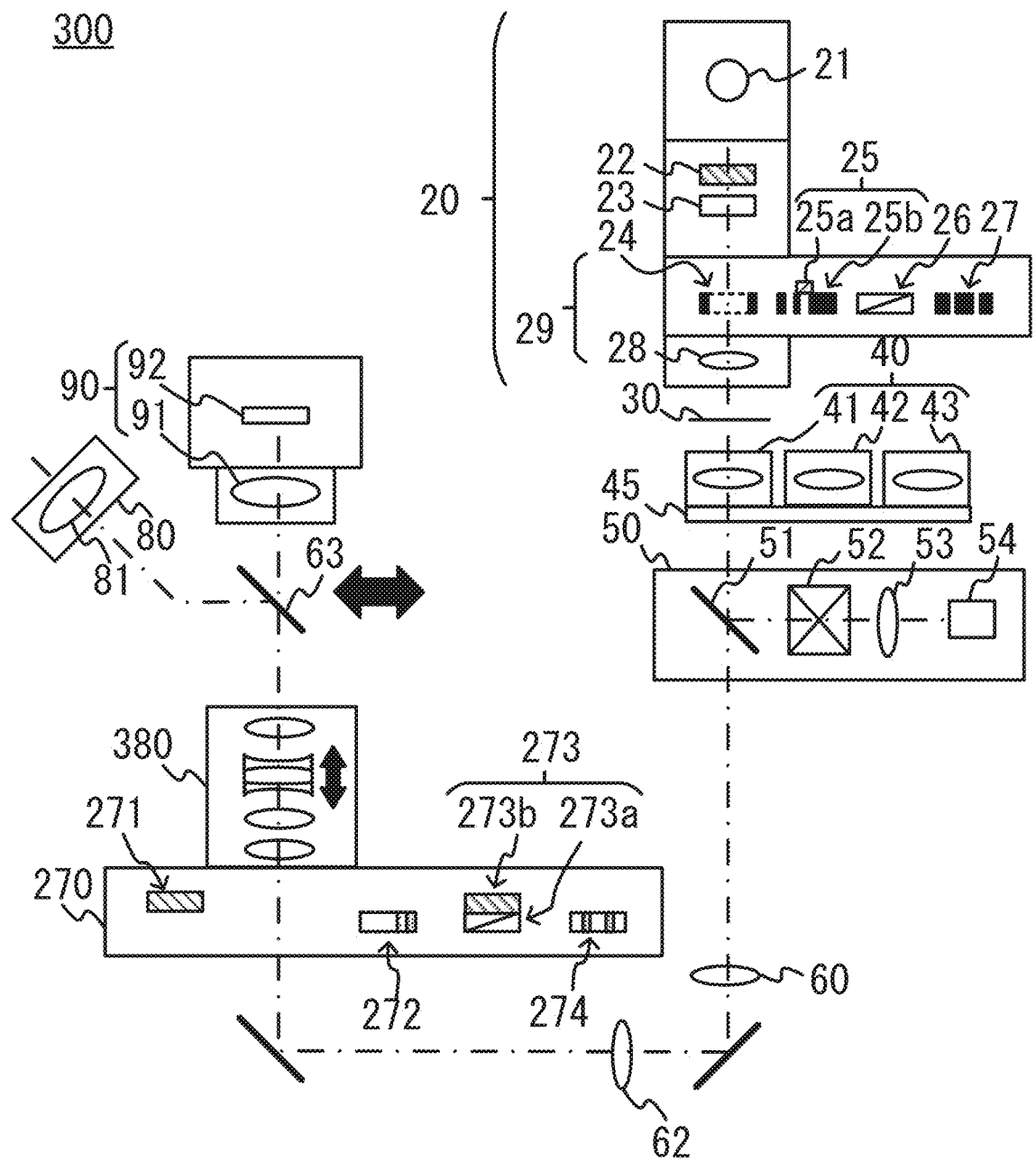
FIG. 8 is a diagram exemplifying a configuration of a microscope 300.

FIG. 8 is a diagram exemplifying a configuration of a microscope 300. A microscopic system according to the present embodiment is different from the microscopic system according to the third embodiment in that the microscope 300 illustrated in FIG. 8 is included instead of the microscope 200. The rest is similar to the microscopic system according to the third embodiment.

The microscope 300 is similar to the microscope 200 illustrated in FIG. 7 in that a microscopy switching device and a magnification adjustment device are included. It is noted however that the microscope 300 is different from the microscope 200 in that the microscopy switching device 270 and a magnification adjustment device 380 are arranged on the optical path on the image side relative to the tube lens 60. In addition, similarly as in the microscope 10 according to the first embodiment, the microscope 300 is also different from the microscope 200 in that the configuration for the phase contrast microscopy is included and that the objective 41 used in the multiple microscopies does not include the modulator for the relief contrast microscopy. It is noted that the magnification adjustment device 380 includes a variable magnification optical system having a structure configured to change its own magnification.

The microscope 300 and the microscopic system including the microscope 300 can also adjust the observation magnification at the same time and also appropriately by simply performing the switching operation of the microscopies at the time of the switching of the microscopies which frequently occurs in the micro insemination. Therefore, the work hours of the micro insemination can be shortened.

Fifth Embodiment

Figure 9:
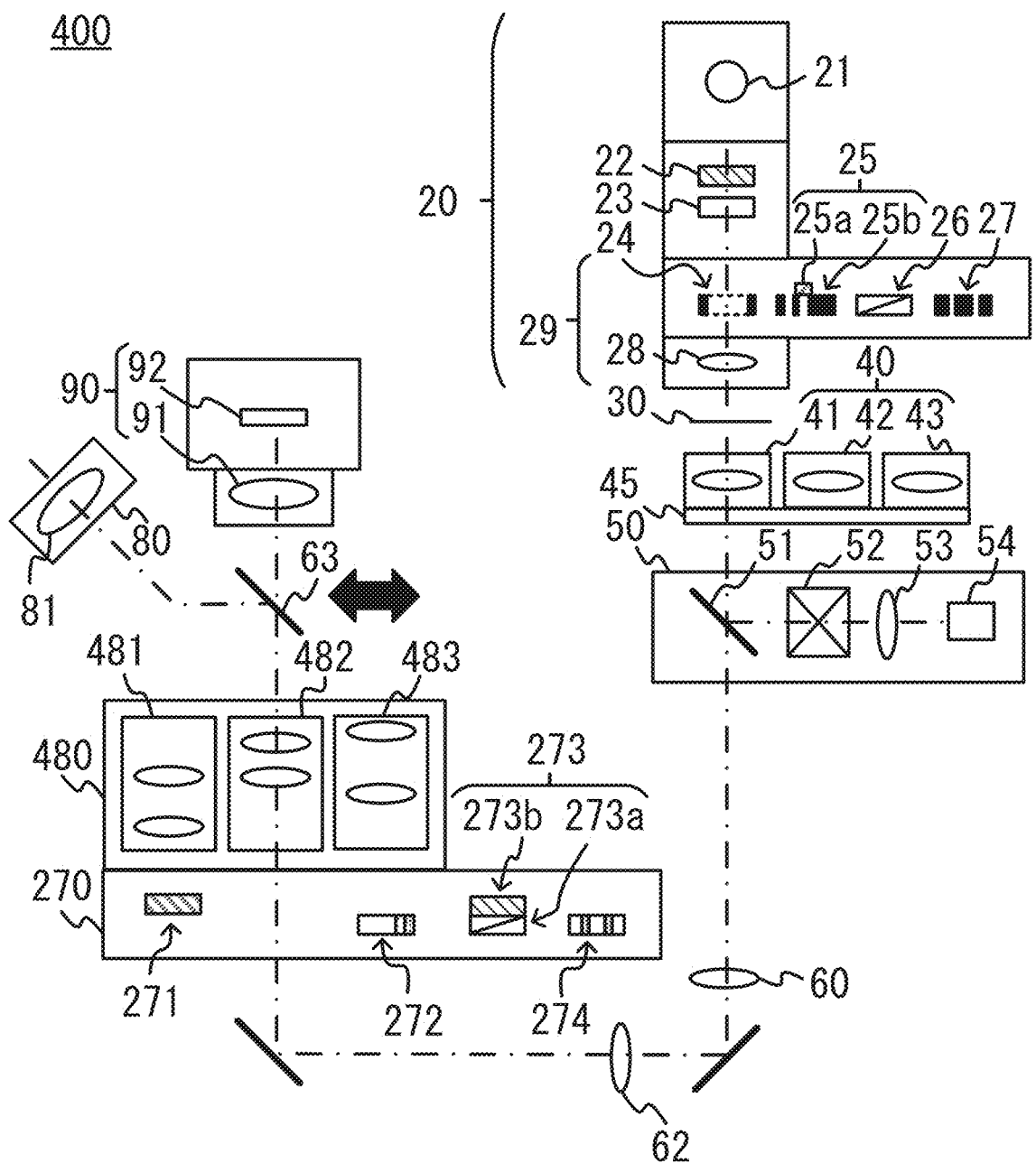
FIG. 9 is a diagram exemplifying a configuration of a microscope 400.

FIG. 9 is a diagram exemplifying a configuration of a microscope 400. A microscopic system according to the present embodiment is different from the microscopic system according to the fourth embodiment in that the microscope 400 illustrated in FIG. 9 is included instead of the microscope 300. The rest is similar to the microscopic system according to the fourth embodiment.

The microscope 400 is similar to the microscope 300 illustrated in FIG. 8 in that a microscopy switching device and a magnification adjustment device are included on the optical path on the image side relative to the tube lens 60. It is noted however that the microscope 400 is different from the microscope 300 in that a magnification adjustment device 480 includes one or more optical systems (an optical system 481, an optical system 482, and an optical system 483) each of which is used in at least one of the multiple microscopies instead of the variable magnification optical system, and adjusts an optical magnification of the microscope 400 by inserting and removing at least one of this one or more optical systems into and from the optical path.

The microscope 400 and the microscopic system including the microscope 400 can also adjust the observation magnification at the same time and also appropriately by simply performing the switching operation of the microscopies at the time of the switching of the microscopies which frequently occurs in the micro insemination. Therefore, the work hours of the micro insemination can be shortened.

Sixth Embodiment

Figure 10:
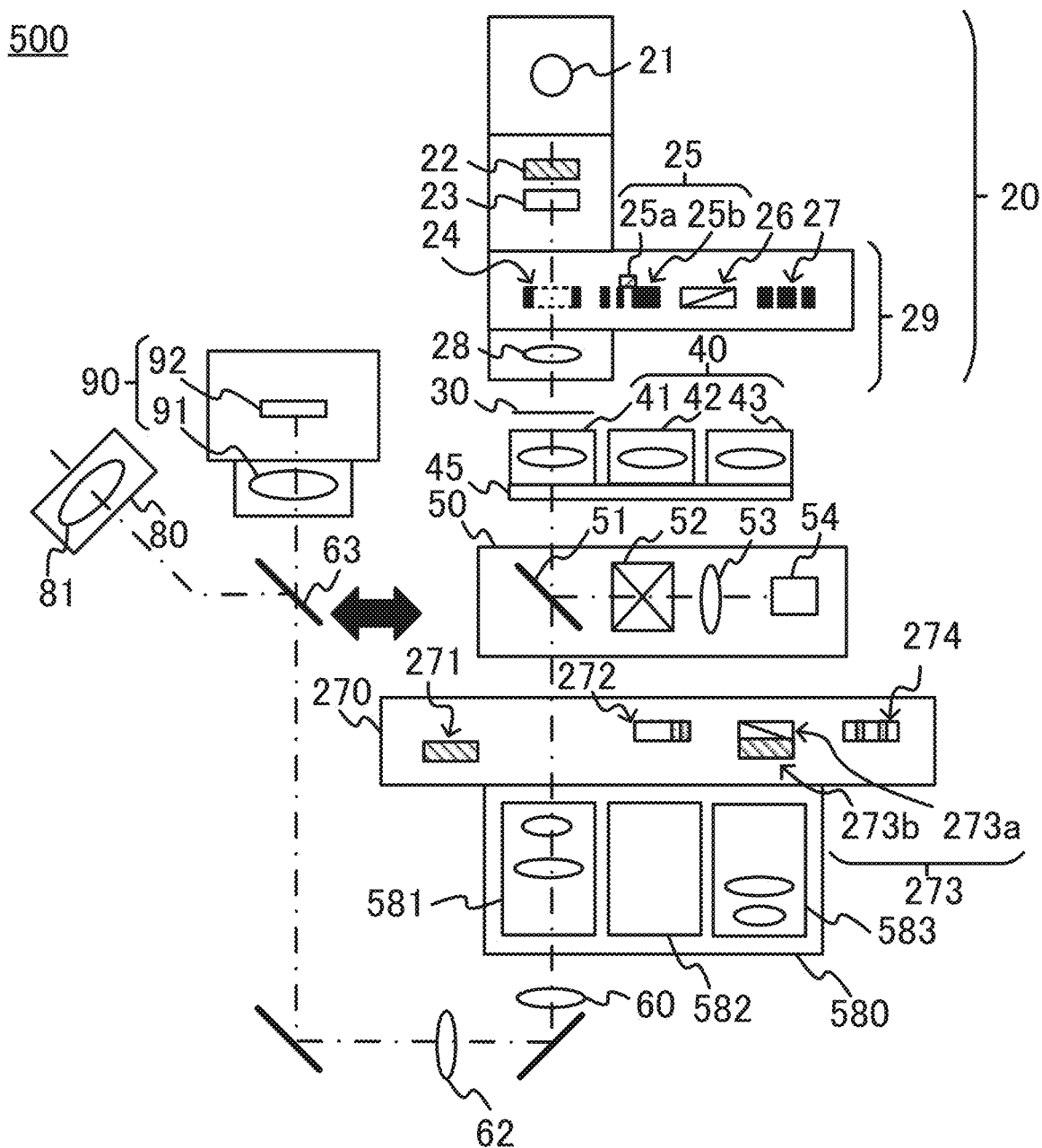
FIG. 10 is a diagram exemplifying a configuration of a microscope 500.

FIG. 10 is a diagram exemplifying a configuration of a microscope 500. A microscopic system according to the present embodiment is different from the microscopic system according to the fifth embodiment in that the microscope 500 illustrated in FIG. 10 is included instead of the microscope 400. The rest is similar to the microscopic system according to the fifth embodiment.

The microscope 500 is similar to the microscope 400 illustrated in FIG. 9 in that a microscopy switching device and a magnification adjustment device are included. It is noted however that the microscope 500 is different from the microscope 400 in that the microscopy switching device 270 and a magnification adjustment device 580 are included on the optical path between the objective 40 and the tube lens 60. It is noted that the microscope 500 is similar to the microscope 400 in that the magnification adjustment device 580 includes one or more optical systems (an optical system 581, an optical system 582, and an optical system 583) each of which is used in at least one of the multiple microscopies, and adjusts an optical magnification of the microscope 500 by inserting and removing at least one of this one or more optical systems into and from the optical path.

As long as a pupil modulation element (a modulator 272, the DIC prism 273a, and a phase plate 274) can be arranged in the exit pupil position of the objective 40, the microscope 500 and the microscopic system including the microscope 500 can also adjust the observation magnification at the same time and also appropriately by simply performing the switching operation of the microscopies at the time of the switching of the microscopies which frequently occurs in the micro insemination. Therefore, the work hours of the micro insemination can be shortened.

The above described embodiments illustrate the specific examples to facilitate understanding of the invention, and the present invention is not limited to these embodiments. Modified modes obtained by modifying the above described embodiments and substitution modes substituting the above described embodiments may be included. In other words, according to the respective embodiments, components can be modified in a range without departing its gist and scope. In addition, a new embodiment can be implemented by appropriately combining a plurality of components disclosed according to one or more embodiments. In addition, some components may be deleted from the components illustrated in the respective embodiments, or some components may be added to the components illustrated in the embodiments. Furthermore, processing procedures illustrated in the respective embodiments may be performed by swapping an order as long as no contradiction occurs. That is, various modification and alterations can be made with regard to the microscope of the present invention within a range without departing from descriptions of the claims.

Figure 11:
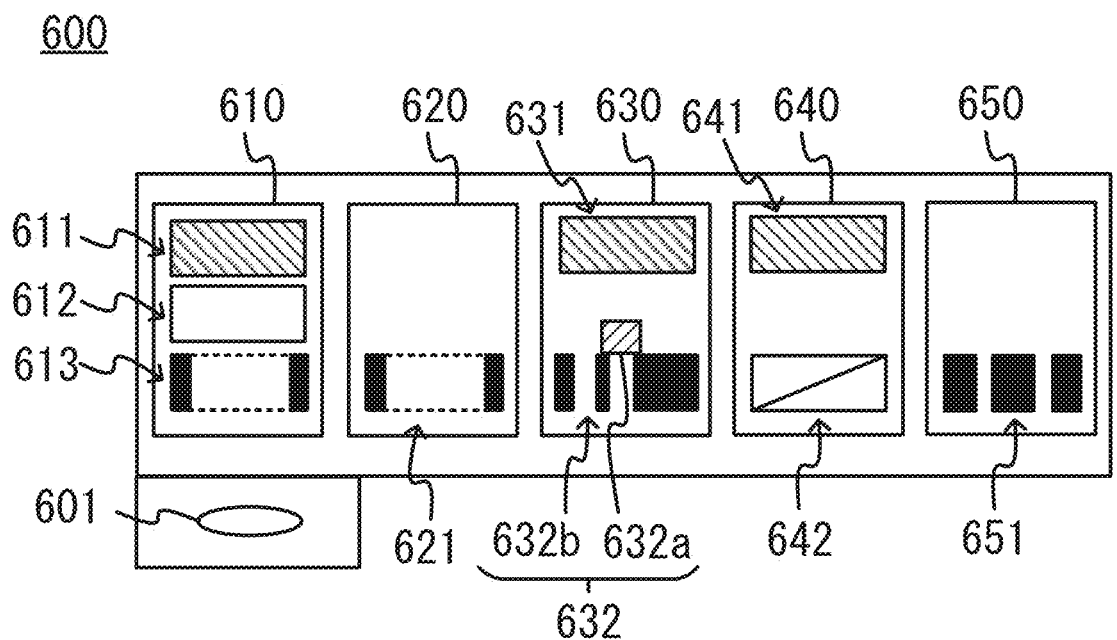
FIG. 11 is a diagram exemplifying a configuration of a universal condenser 600.

FIG. 11 is a diagram exemplifying a configuration of a universal condenser 600. According to the above described embodiments, the example has been illustrated in which the polarizer 22 and the compensator 23 to be arranged on the illumination optical path are arranged outside the turret of the universal condenser 29. However, as illustrated in FIG. 11, the polarizer 22 and the compensator 23 may be included in the universal condenser 600, and may be inserted into and removed from the optical path when necessary by a turret provided on an incident side of a condenser lens 601 similarly as in the other modulation optical element.

It is noted that FIG. 11 illustrates a configuration in which an optical unit 610 used in the polarized light microscopy, an optical unit 620 used in the bright field microscopy, an optical unit 630 used in the relief contrast microscopy, an optical unit 640 used in the differential interference contrast microscopy, and an optical unit 650 used in the phase contrast microscopy can be switched by the turret of the universal condenser 600.

The optical unit 610 accommodates an apertured plate 613 together with a polarizer 611 and a compensator 612. The optical unit 620 accommodates an apertured plate 621. The optical unit 630 accommodates a polarizer 631 and a modulator 632. The modulator 632 is configured by a polarization plate 632a and a rectangular slit plate 632b. It is noted that the polarizer 631 is accommodated in the optical unit 630 to be rotatable for changing an oscillation direction that the polarizer 631 has relative to an oscillation direction that the polarization plate 632a has. The optical unit 640 accommodates a polarizer 641 and a DIC prism 642. The optical unit 650 accommodates a ring slit plate 651.

Figure 12:
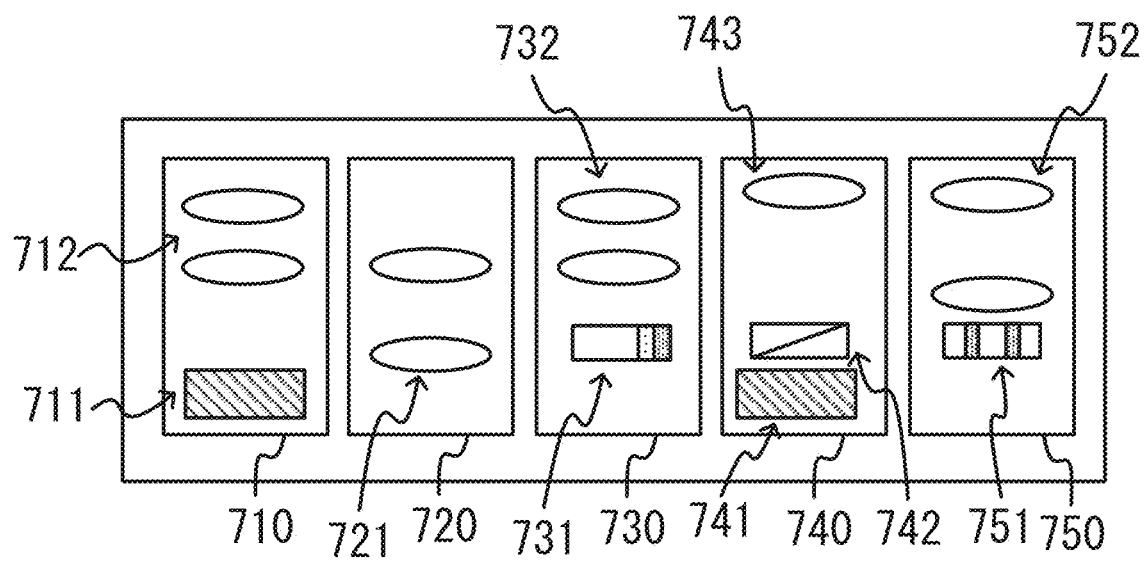
FIG. 12 is a diagram exemplifying a configuration of a magnification adjustment device 700.

FIG. 12 is a diagram exemplifying a configuration of a magnification adjustment device 700. FIG. 1 illustrates the example in which the analyzer 61 to be arranged on the observation optical path is arranged outside the turret of the magnification adjustment device. However, as illustrated in FIG. 12, the analyzer 61 may be included in the magnification adjustment device, and may be inserted into and removed from the optical path when necessary by the turret of the magnification adjustment device similarly as in the other modulation optical element.

It is noted that FIG. 12 illustrates a configuration in which an optical unit 710 used in the polarized light microscopy, an optical unit 720 used in the bright field microscopy, an optical unit 730 used in the relief contrast microscopy, an optical unit 740 used in the differential interference contrast microscopy, and an optical unit 750 used in the phase contrast microscopy can be switched by the turret of the magnification adjustment device 700.

The optical unit 710 accommodates an analyzer 711 together with an optical system 712. The optical unit 720 accommodates an optical system 721. The optical unit 730 accommodates a modulator 731 and an optical system 732. The optical unit 740 accommodates an analyzer 741, a DIC prism 742, and an optical system 743. The optical unit 750 accommodates a phase plate 751 and an optical system 752.

Figure 13:
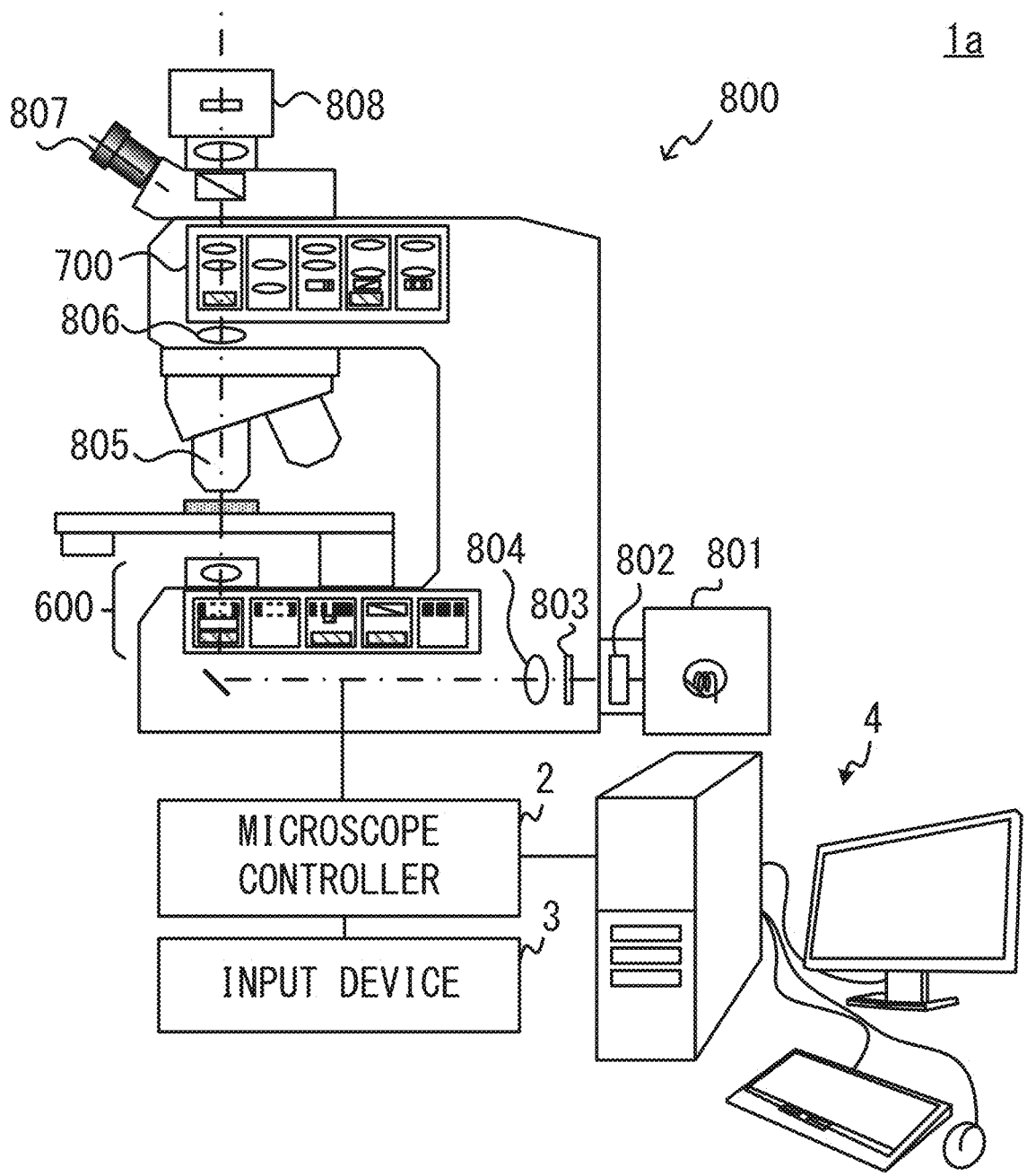

FIG. 13 is a diagram exemplifying a configuration of a microscopic system 1a. The microscopic system 1a is different from the microscopic system 1 illustrated in FIG. 1 in that a microscope 800 is included instead of the microscope 10. The microscope 800 is an erect microscope including the universal condenser 600 illustrated in FIG. 11 described above and the magnification adjustment device 700 illustrated in FIG. 12 described above which are respectively on the illumination optical path and the observation optical path. The microscope 800 extracts near infrared light from illumination light emitted from a light source device 801 by a bandpass filter 802 for irradiation of the specimen by the universal condenser 600 with incidence via a collector lens 804. The embryologist may check an image of the specimen which is captured by an imaging device 808 by the monitor of the computer 4. In the microscope 800, the microscopies and the observation magnifications can be changed by switching the magnification adjustment device 700 and the universal condenser 600 in an interlocking manner.

According to the above described embodiments, the inverted microscope is exemplified, but as illustrated in FIG. 13, the present invention may be applied to an elect microscope, and in this case too, a similar advantage can be attained. In addition, according to the above described embodiments, the example has been illustrated in which the optical elements and the optical systems are switched by using the turret, but the optical elements and the optical systems may be switched by using another switching unit such as a slider. In addition, according to the above described embodiments, the example has been illustrated in which the microscopies and the observation magnifications are switched in an interlocking manner, but furthermore, by being interlocked with these, an amount of the illumination light emitted from the light source device may be adjusted. Specifically, the microscope controller 2 functioning as a light source control device may adjust the amount of the illumination light emitted from the light source device 21 in response to the switching of the multiple microscopies. For example, the microscope controller 2 may control to increase the light amount since the image tends to be darkened in the polarized light microscopy or the differential interference contrast microscopy in which the adjustment is performed such that the polarizer 22 and the analyzer 61 have a cross Nicol relationship.

What is claimed is:

1. A microscope used in multiple microscopies, the microscope comprising:
    an objective used in common in the multiple microscopies; and
    a magnification adjustment device arranged on an image side relative to a position of the objective and configured to adjust an optical magnification of the microscope in response to switching of the multiple microscopies, wherein
    the magnification adjustment device includes a plurality of optical units corresponding to the multiple microscopies,
    each of the plurality of optical units includes an optical system having a magnification according to a magnification ratio between a magnification of the objective and a predetermined magnification for a microscopy corresponding to the optical unit,
    the multiple microscopies include at least two of a bright field microscopy, a dark field microscopy, a polarized light microscopy, a phase contrast microscopy, a differential interference contrast microscopy, a fluorescence microscopy, and a relief contrast microscopy, and
    when the optical magnification of the microscope is different from a predetermined magnification for a microscopy after the switching, the magnification adjustment device is configured to change the optical magnification of the microscope to the predetermined magnification, by switching the plurality of optical units with the objective used in common being positioned on an optical path of the microscope.

2. The microscope according to claim 1, wherein at least one of the plurality of optical units further includes a modulation optical element according to a microscopy corresponding to the at least one of the plurality of optical units.

3. The microscope according to claim 2, wherein
    the plurality of optical units include a first optical unit corresponding to the bright field microscopy, a second optical unit corresponding to the relief contrast microscopy, and a third optical unit corresponding to the phase contrast microscopy or the differential interference contrast microscopy,
    the first optical unit includes an optical system having a magnification below 1×,
    the second optical unit includes the modulation optical element used in the relief contrast microscopy, and
    the third optical unit includes an optical system having a magnification above 1×, and a modulation optical element used in the phase contrast microscopy or the differential interference contrast microscopy.

4. The microscope according to claim 3, wherein
    the plurality of optical units further include a fourth optical unit corresponding to the polarized light microscopy, wherein
    the fourth optical unit includes the modulation optical element used in the polarized light microscopy.

5. The microscope according to claim 1, wherein
    a first predetermined magnification for the bright field microscopy is lower than a second predetermined magnification for the phase contrast microscopy or the differential interference contrast microscopy, and
    a third predetermined magnification for the relief contrast microscopy is higher than the first predetermined magnification and lower than the second predetermined magnification.

6. The microscope according to claim 5, wherein
    the multiple microscopies further include the polarized light microscopy, and
    a fourth predetermined magnification for the polarized light microscopy is equal to the third predetermined magnification.

7. The microscope according to claim 1, wherein the magnification adjustment device adjusts the optical magnification within an adjustment range in which a magnification ratio of an upper limit value to a lower limit value of the optical magnification is 3 or higher to 1.

8. The microscope according to claim 1, wherein the magnification adjustment device adjusts the optical magnification to a magnification at which a wider range is observed than a range on a specimen surface which is set by a magnification of the objective and an objective field number (OFN) of the objective in response to switching to a predetermined microscopy.

9. The microscope according to claim 1, further comprising:
    a tube lens arranged on the image side relative to the position of the objective,
    wherein the magnification adjustment device adjusts the optical magnification on the optical path on the image side relative to the tube lens.

10. The microscope according to claim 1, further comprising:
    a tube lens arranged on the image side relative to the position of the objective,
    wherein the magnification adjustment device adjusts the optical magnification on the optical path between the objective and the tube lens.

11. The microscope according to claim 1, further comprising:
    a light source device configured to emit illumination light; and
    a light source control device configured to control a light amount of the illumination light emitted from the light source device in response to the switching of the multiple microscopies.

12. The microscope according to claim 1, wherein the microscope is an inverted microscope.

13. The microscope according to claim 1, wherein the plurality of optical units of the magnification adjustment device are arranged on a turret, and the turret is switched by rotation of the turret.

* * * * *